United States Patent
Zhou

(10) Patent No.: US 12,388,286 B2
(45) Date of Patent: Aug. 12, 2025

(54) CHARGE CONTROL DEVICE

(71) Applicant: DENSO CORPORATION, Kariya (JP)

(72) Inventor: Bo Zhou, Kariya (JP)

(73) Assignee: DENSO CORPORATION, Kariya (JP)

( * ) Notice: Subject to any disclaimer, the term of this patent is extended or adjusted under 35 U.S.C. 154(b) by 627 days.

(21) Appl. No.: 17/743,736

(22) Filed: May 13, 2022

(65) Prior Publication Data

US 2022/0278545 A1 Sep. 1, 2022

Related U.S. Application Data

(63) Continuation of application No. PCT/JP2020/042148, filed on Nov. 11, 2020.

(30) Foreign Application Priority Data

Nov. 13, 2019 (JP) .................................. 2019-205714

(51) Int. Cl.
- B60L 53/62 (2019.01)
- B60L 53/60 (2019.01)
(Continued)

(52) U.S. Cl.
CPC ........ H02J 7/007194 (2020.01); B60L 53/60 (2019.02); B60L 58/12 (2019.02);
(Continued)

(58) Field of Classification Search
CPC .. H02J 7/007194; H02J 7/0048; H02J 7/0047; H02J 7/0071; B60L 53/60;
(Continued)

(56) References Cited

U.S. PATENT DOCUMENTS

| | | | |
|---|---|---|---|
| 2001/0048289 A1 | 12/2001 | Sakakibara | |
| 2009/0085527 A1* | 4/2009 | Odaohhara | H02J 7/007194 320/150 |

(Continued)

FOREIGN PATENT DOCUMENTS

| | | |
|---|---|---|
| JP | H09-154239 A | 6/1997 |
| JP | 2013-135510 A | 7/2013 |

*Primary Examiner* — Julian D Huffman
*Assistant Examiner* — Aiman Bickiya
(74) *Attorney, Agent, or Firm* — Oliff PLC

(57) ABSTRACT

A charge control device calculates a learning command value of a charging parameter used in a learning phase, operates a charger in the learning phase to control the charging parameter to the learning command value, calculates a learning temperature rise rate, based on the temperature of the secondary battery, calculates a charging-time temperature rise rate in a charging phase that follows the learning phase, prior to the start of the charging phase, based on a limit temperature of the secondary battery and a duration of the charging phase, calculates a charging command value of a charging parameter which is used during a period from the start to the end of the charging phase, based on the learning command value, the learning temperature rise rate, and the charging-time temperature rise rate, and operates the charger in the charging phase to control the charging parameter to the charging command value.

10 Claims, 7 Drawing Sheets

(51) Int. Cl.
 *B60L 58/12* (2019.01)
 *H01M 10/44* (2006.01)
 *H02J 7/00* (2006.01)

(52) U.S. Cl.
 CPC ......... *H01M 10/443* (2013.01); *H02J 7/0048* (2020.01); *B60L 2240/545* (2013.01)

(58) Field of Classification Search
 CPC .............. B60L 58/12; B60L 2240/545; B60L 2240/547; B60L 2240/549; B60L 2260/46; B60L 58/24; B60L 53/62; H01M 10/443; H01M 10/44; H01M 10/486; H01M 10/48
 USPC ........................................................ 320/152
 See application file for complete search history.

(56) References Cited

U.S. PATENT DOCUMENTS

| | | |
|---|---|---|
| 2012/0217933 A1 | 8/2012 | Abe et al. |
| 2013/0314054 A1 | 11/2013 | Bergqvist et al. |
| 2015/0162771 A1 | 6/2015 | Monden et al. |
| 2016/0347302 A1* | 12/2016 | Niwa ................. B60H 1/00278 |
| 2016/0375773 A1* | 12/2016 | Fushiki ................ B60W 20/18 701/22 |
| 2017/0170666 A1 | 6/2017 | Watanabe et al. |
| 2018/0026454 A1 | 1/2018 | Belkacem-Boussaid et al. |
| 2019/0207406 A1* | 7/2019 | Matthey ............. H02J 7/00309 |

\* cited by examiner

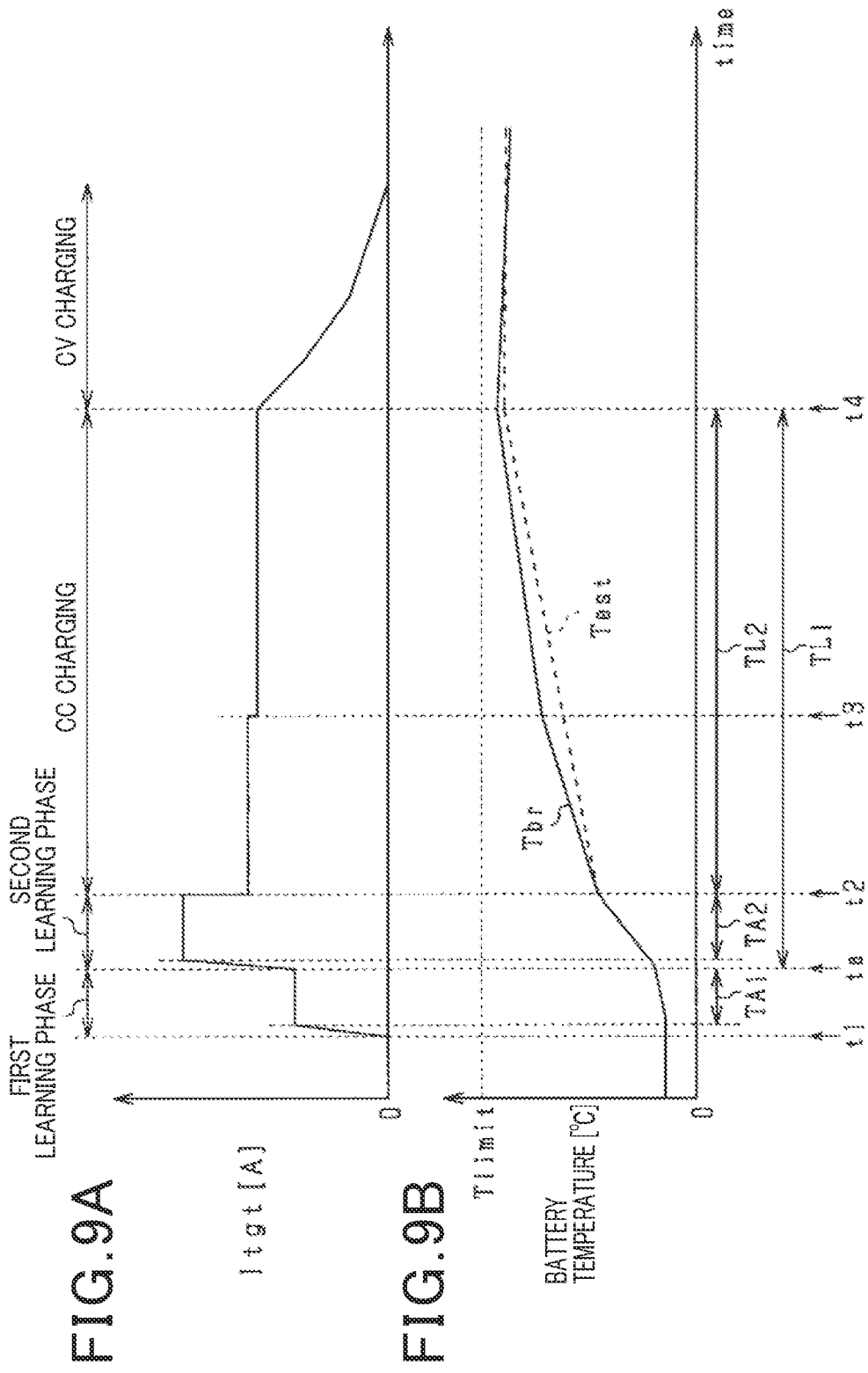

CHARGE CONTROL DEVICE

CROSS-REFERENCE TO RELATED APPLICATION

The present application is a continuation application of International Application No. PCT/JP2020/042148, filed on Nov. 11, 2020, which claims priority to Japanese Patent Application No. 2019-205714, filed on Nov. 13, 2019. The contents of these applications are incorporated herein by reference in their entirety.

BACKGROUND

Technical Field

The present disclosure relates to charge control devices that perform charge control for secondary batteries.

Background Art

In a charge control device, charging current of a secondary battery is controlled to its command current so that the temperature of the secondary battery does not exceed the limit temperature.

SUMMARY

In the present disclosure, provided is a charge control device as the following.

The charge control device calculates a learning command value of a charging parameter used in a learning phase, operates a charger in the learning phase to control the charging parameter to the learning command value, calculates a learning temperature rise rate, based on the temperature of the secondary battery, calculates a charging-time temperature rise rate in a charging phase that follows the learning phase, prior to the start of the charging phase, based on a limit temperature of the secondary battery and a duration of the charging phase, calculates a charging command value of a charging parameter which is used during a period from the start to the end of the charging phase, based on the learning command value, the learning temperature rise rate, and the charging-time temperature rise rate, and operates the charger in the charging phase to control the charging parameter to the charging command value.

BRIEF DESCRIPTION OF THE DRAWINGS

The aim set forth above and other aims, features, and advantageous effects of the present disclosure will become clearer from the following detailed description given referring to the accompanying drawings. In the drawings:

FIGS. 9A to 9B are a joint timing diagram illustrating an example of charge control processing.

DETAILED DESCRIPTION OF THE PREFERRED EMBODIMENTS

Figure 1:
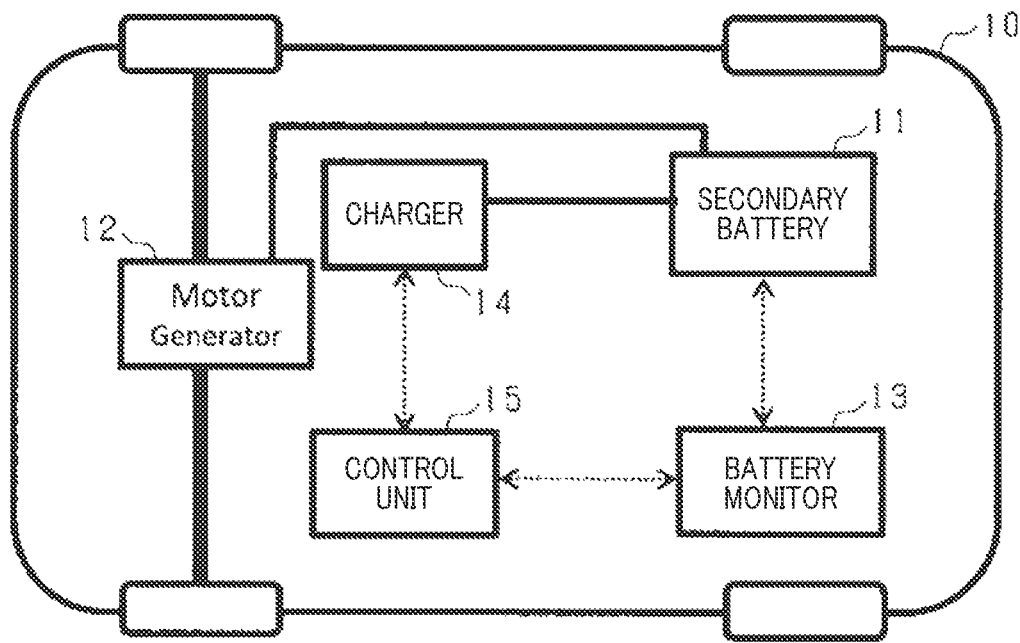
FIG. 1 is a diagram illustrating an overall configuration of a vehicle-mounted charging system according to a first embodiment.

As this type of control devices, there is known one as shown in PTL 1 in which charging current of a secondary battery is controlled to its command current so that the temperature of the secondary battery does not exceed the limit temperature. Specifically, this control device calculates a command current based on the limit temperature, internal resistance of the secondary battery, and charging period of the secondary battery. Thus, the secondary battery is prevented from being brought into an overheated state during charge control.

PTL 1: JP 2017-108522 A

Secondary batteries will degrade over time. If time degradation occurs, temperature characteristics of the secondary battery when charged can change. Also, every time the secondary battery is charged, ambient temperature of the secondary battery can change. Accordingly, the influence of time degradation or ambient temperature of the secondary battery is required to be considered to appropriately calculate a command value of the charging current or the charging power of the secondary battery, which would not allow the temperature of the secondary battery to exceed the limit temperature.

The present disclosure mainly aims to provide a charge control device which is capable of enhancing the accuracy of calculating a command value of the charging current or the charging power of a secondary battery, which would not allow the temperature of the secondary battery to exceed the limit temperature.

In the present disclosure, a charge control device is configured to be applied to a system including a secondary battery and a charger electrically connected to the secondary battery and cause the charger to control a charging parameter that is either of charging current and charging power of the secondary battery.

The charge control device includes:
- a learning command value calculation unit configured to calculate a learning command value of the charging parameter used in a learning phase that is an initial period of a charge control period of the secondary battery, based on a temperature of the secondary battery;
- a learning-time operation unit configured to operate the charger in the learning phase to control the charging parameter to the learning command value;
- a learning temperature rise rate calculation unit configured to calculate a learning temperature rise rate that is a temperature rise rate of the secondary battery in the learning phase, based on a temperature of the secondary battery;
- a charging-time temperature rise rate calculation unit configured to calculate a charging-time temperature rise rate that is a temperature rise rate of the secondary battery in a charging phase that follows the learning phase in the charge control period, prior to start of the charging phase, based on a limit temperature of the secondary battery and a duration of the charging phase;

a charging command value calculation unit configured to calculate a charging command value of the charging parameter, which is used during a period from start to end of the charging phase, based on the learning command value, the learning temperature rise rate, and the charging-time temperature rise rate; and a charging-time operation unit configured to operate the charger in the charging phase to control the charging parameter to the charging command value.

In the present disclosure, a learning temperature rise rate, which is a temperature rise rate of the secondary battery in the case where the charging parameter is controlled to the learning command value, is calculated in the learning phase which is set in an initial period of a charge control period of the secondary battery. Using the learning command value and the learning temperature rise rate, appropriate temperature variation characteristics of the secondary battery can be quantified, incorporating the current deterioration state and ambient temperature of the secondary battery.

In the present disclosure, a charging-time temperature rise rate, which is a temperature rise rate of the secondary battery in the charging phase that follows the learning phase, is calculated based on the limit temperature of the secondary battery and duration of the charging phase. Then, in addition to the charging-time temperature rise rate, the learning command value and the learning temperature rise rate are used for calculating a charging command value. Since the learning command value and the learning temperature rise rate are calculated in the learning phase set in the same charge control period, they are values quantifying appropriate temperature variation characteristics of the secondary battery with the incorporation of the current deterioration state and ambient temperature thereof. Accordingly, use of the learning command value and the learning temperature rise rate in addition to the charging-time temperature rise rate can lead to calculation of an appropriate charging command value incorporating the current deterioration state and ambient temperature of the secondary battery. Consequently, high accuracy can be secured for calculating a charging command value which would not allow the temperature of the secondary battery to exceed the limit temperature in the charging phase.

Furthermore, prior to the start of the charging phase in the present disclosure, a charging command value is calculated which is used during the period from the start to the end of the charging phase, so that the calculated charging command value can be basically used in the charging phase. Thus, the period from the start to the end of charging the secondary battery is prevented from significantly deviating from the charge control period.

First Embodiment

Referring to the drawings, a first embodiment of a charge control device according to the present disclosure will be described. The charge control device according to the present embodiment is installed to a vehicle.

As shown in FIG. 1, a vehicle 10 includes a secondary battery 11 and a rotary electric machine 12. The secondary battery 11 may be, for example, a lithium ion battery, or nickel metal hydride battery or nickel hydrogen battery, which is assumed to be a battery pack in the present embodiment. The rotary electric machine 12 is driven with power supplied from the secondary battery 11 to serve as a travelling power source of the vehicle 10.

The vehicle 10 includes a battery monitor 13, a charger 14 and a control unit 15, The battery monitor 13 detects a terminal voltage or the like of each battery cell forming the secondary battery 11, and calculates a state of charge (SOC) or the like of each battery cell. The charger 14 is a device that charges electrical power supplied from power supply equipment, which is set up outside the vehicle 10, to the secondary battery 11.

Figure 2:
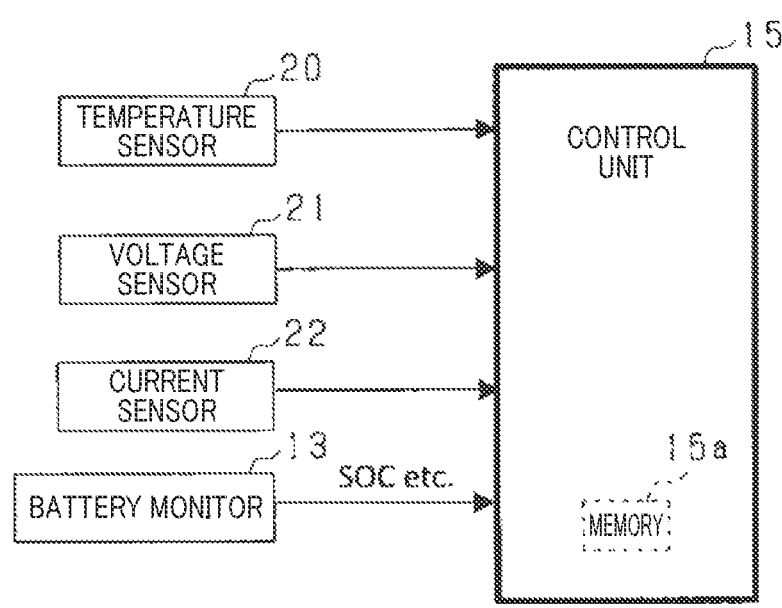
FIG. 2 is a diagram illustrating a control unit and a sensor and the like as the peripheral components.

As shown in FIG. 2, the vehicle 10 includes a temperature sensor 20, a voltage sensor 21, and a current sensor 22. The temperature sensor 20 detects a temperature of the secondary battery 11, the voltage sensor 21 detects a terminal voltage of the secondary battery 11, and the current sensor 22 detects a current passing through the secondary battery 11. The detected values of the sensors 20 to 22, and the information on SOC of the secondary battery 11 calculated by the battery monitor 13, and other information are inputted to the control unit 15.

The control unit 15 performs charge control processing to control charging from the charger 14 to the secondary battery 11, based on the detected values and information inputted therein. It should be noted that the functions of the control unit 15 can be provided by, for example, software recorded on a tangible memory device and a computer executing the software, hardware, or a combination of these.

Next, a description will be given of charge control processing for the secondary battery 11 executed by the control unit 15. In the present embodiment, a charge control period for the secondary battery 11 includes a learning phase, constant current charging phase (corresponding to the charging phase), and constant voltage charging phase.

Figure 3:
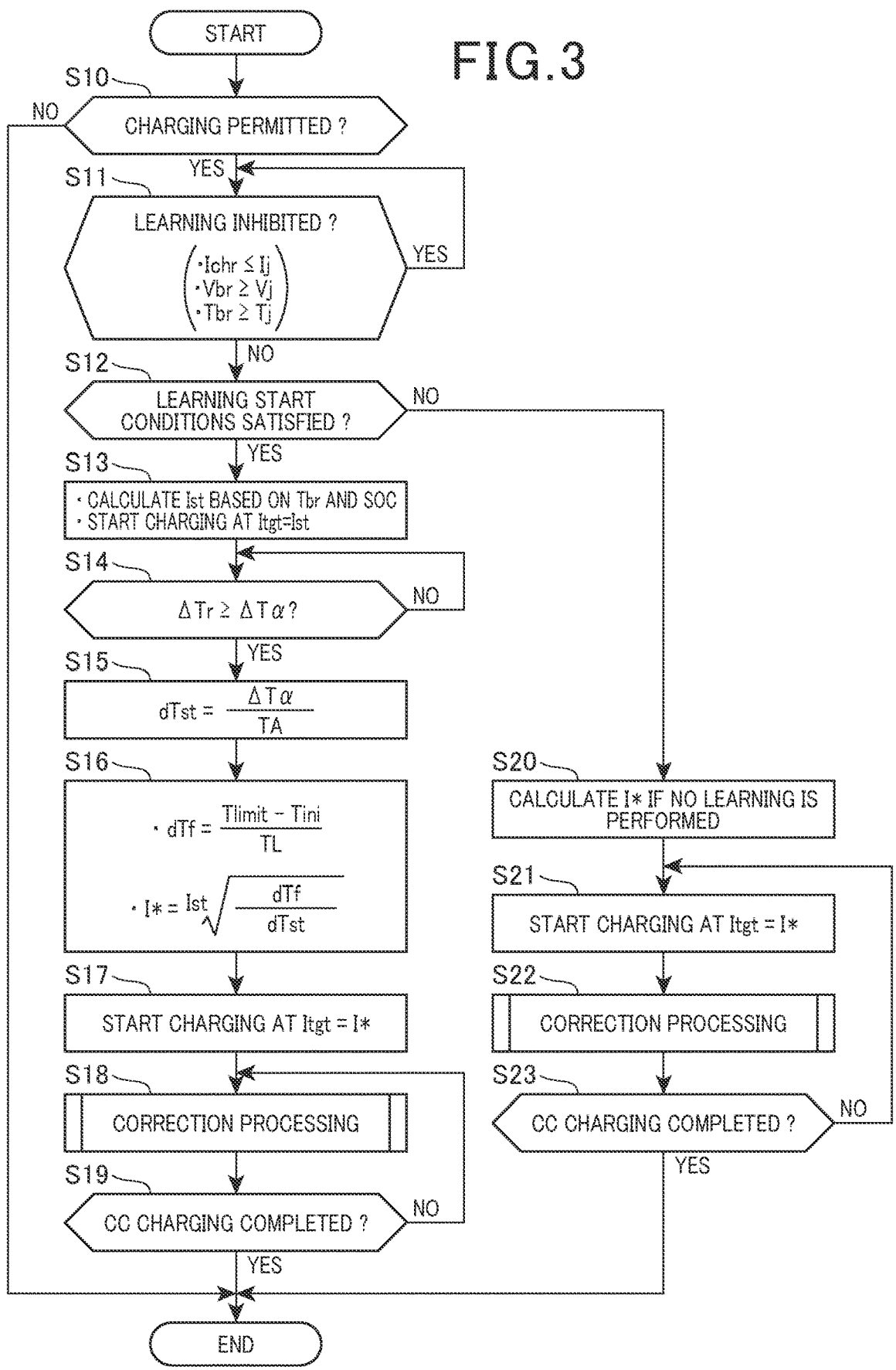
FIG. 3 is a flow diagram illustrating charge control processing.

FIG. 3 shows the charge control processing performed for the secondary battery 11.

At step S10, is determined whether there is charging permission for the secondary battery 11. If it is determined that there is charging permission, charging of the secondary battery 11 is started so that charging current begins to pass through the secondary battery 11.

At the subsequent step S11, it is determined whether learning processing is inhibited. In the present embodiment, if at least one of the following first to third requirements is determined to be met, it is determined that the learning processing is inhibited.

The first condition is that the charging current of the secondary battery 11 detected by the current sensor 22 (termed detected charging current Ichr hereinafter) is equal to or less than a predetermined current Ij. This condition is for determining that the current charging mode is the normal charging mode and not the fast charging mode. In other words, in the present embodiment, execution of the learning processing is inhibited if the charging mode is the normal charging mode.

The second condition is that the terminal voltage of the secondary battery 11 detected by the voltage sensor 21 (termed detected voltage Vbr hereinafter) is equal to or higher than a predetermined voltage Vj. This condition is for determining whether the learning phase can be secured during the charge control period. In other words, in the present embodiment, a sufficient period as the learning phase cannot be secured if the detected voltage Vbr is higher than a certain level, because the constant voltage charging phase is started when the detected voltage Vbr has reached a target voltage Vtgt. It should be noted that the predetermined voltage Vj may be set, for example, to a value equal to or slightly lower than the target voltage Vtgt.

The third condition is that the temperature of the secondary battery 11 detected by the temperature sensor 20 (termed detected temperature Tbr hereinafter) is equal to or higher than a predetermined temperature Tj. This condition is for determining whether there is a risk of the secondary battery 11 undergoing charge control processing being brought into an overheated state. It should be noted that the processing of step S11 corresponds to the inhibition determination unit.

If it is determined at step S11 that learning processing has not been inhibited, control proceeds to step S12 where it is determined whether conditions for starting the learning processing have been satisfied. In the present embodiment, if the variation amount of the detected charging current Ichr is determined to be equal to or smaller than a predetermined variation amount, the charging current is determined to be stable and thus it is determined that conditions for starting the learning processing have been satisfied.

If it is determined at step S12 that starting conditions have been satisfied, control proceeds to step S13 where the learning phase is started. At step S13, the detected temperature Tbr and SOC of the secondary battery 11 are acquired, based on which, a command learning current Ist (corresponding to the learning command value) that is a command of charging current of the secondary battery 11 in the learning phase is calculated. The command learning current Ist may be calculated, for example, to have a smaller value, as the detected temperature Tbr moves away from a reference temperature of around 0° C. toward a lower temperature side or a higher temperature side. Also, the command learning current Ist may be calculated, for example, to have a larger value as SOC becomes higher.

It should be noted that the command learning current Ist may be calculated, for example, based on map information in which the command learning current Ist is specified in relation to the detected temperature Tbr and SOC. This map information is stored in a memory 15a provided to the control unit 15. The memory 15a is a non-transitory tangible recording medium other than ROM (e.g., nonvolatile memory other than ROM).

Then, at step S13, processing is started in which the calculated command learning current Ist is set as a target current Itgt so that the detected charging current Ichr (corresponding to the charging parameter) is feedback-controlled to the target current Itgt with the operation of the charger 14. Thus, charging of the secondary battery 11 is started at the command learning current Ist. It should be noted that, in the present embodiment, the processing of step S13 corresponds to the learning command value calculation unit and the learning-time operation unit.

At step S14, based on the detected temperature Tbr, it is determined whether the amount of temperature rise ΔTr has become a determined amount of rise ΔTα (e.g., 0.5° C.) since the beginning of charging the secondary battery 11 at the command learning current Ist in the processing of step S13.

If an affirmative determination is made at step S14, control proceeds to step S15 where a learning period TA is calculated, which is a period from the beginning of charging the secondary battery 11 at the command learning current Ist in the processing of step S13 until the affirmative determination made at step S14. Then, the determined amount of rise ΔTα is divided by the calculated learning period TA to calculate a learning temperature rise rate dTst. The processing of step S15 corresponds to the learning temperature rise rate calculation unit.

At step S16, a charging-time temperature rise rate dTf is calculated using the following equation (eq1), based on a limit temperature Tlimit of the secondary battery 11, an initial temperature Tini that is the detected temperature Tbr acquired currently, and a determined period TL.

[Math. 1]
$$dTf = \frac{T_{limit} - T_{ini}}{TL} \quad (eq1)$$

In the present embodiment, the determined period TL is set to an assumed value corresponding to the duration of the constant current charging phase. Since the durations of the constant current charging phase can vary depending on SOC or the like of the secondary battery 11 before the start of charging, the actual duration of the constant current charging phase can be deviated from the above assumed value. The limit temperature Tlimit is set to, for example, an allowable upper limit temperature of the secondary battery 11 with which deterioration of the secondary battery 11 can be avoided.

At step S16, a command charging current I* (corresponding to the charging command value) is calculated using the following equation (eq2), based on the calculated charging-time temperature rise rate dTf, the learning temperature rise rate dTst calculated at step S15, and the command learning current Ist calculated at step S13.

[Math. 2]
$$I* = I_{st}\sqrt{\frac{dTf}{dTst}} \quad (eq2)$$

The equation (eq2) has been derived by setting a condition R1=R2 on the following equation (eq3) which indicates a relationship of the amount of heat generation and temperature rise rate of the secondary battery 11 in the learning phase, with the amount of heat generation and temperature rise rate of the secondary battery 11 in the constant current charging phase. R1 indicates internal resistance of the secondary battery 11 in the learning phase, and R2 indicates internal resistance of the secondary battery 11 in the constant current charging phase.

[Math. 3]
$$\frac{I_{st}^2 \cdot R_1}{I^{*2} \cdot R_2} = \frac{dTf}{dTst} \quad (eq3)$$

Since variation in ambient temperature and internal resistance of the secondary battery 11 can be neglected in a short-duration charging process, the equation (eq3) can be approximately expressed as the equation (eq2). It should be noted that the processing of step S16 corresponds to the charging-time temperature rise rate calculation unit and the charging command value calculation unit.

Then, at step S17, processing is started in which the calculated command charging current I* is set as the target current Itgt so that the detected charging current Ichr is feedback-controlled to the target current Itgt with the operation of the charger 14. Thus, the constant current charging phase is started to start charging the secondary battery 11 at the command charging current I*. It should be noted that, in the present embodiment, the processing of step S17 corresponds to the charging-time operation unit.

In the present embodiment, the command charging current I* calculated at step S16 is basically used as the target current Itgt from the start of the constant current charging phase until the lapse of the determined period TL. This is because, in the present embodiment, the vehicle 10 is equipped with neither a fan nor a cooling device, such as a cooling channel, for cooling the secondary battery 11. In other words, in this case, if the temperature of the secondary battery 11 increases during charging of the secondary battery 11, the increased temperature cannot be decreased quickly and the temperature of the secondary battery 11 may exceed the limit temperature Tlimit. In particular, if charging is performed while the vehicle is stopped, the effect of cooling the secondary battery, which would be exerted while the vehicle 10 is travelling, cannot be expected and thus it is highly likely that the temperature of the secondary battery 11 will exceed the limit temperature Tlimit. Accordingly, a command charging current I* that will not allow the temperature of the secondary battery 11 to exceed the limit temperature Tlimit is determined prior to the start of the constant current charging phase, so that the command charging current I* is basically used as the target current Itgt in the constant current charging phase.

Figure 4:
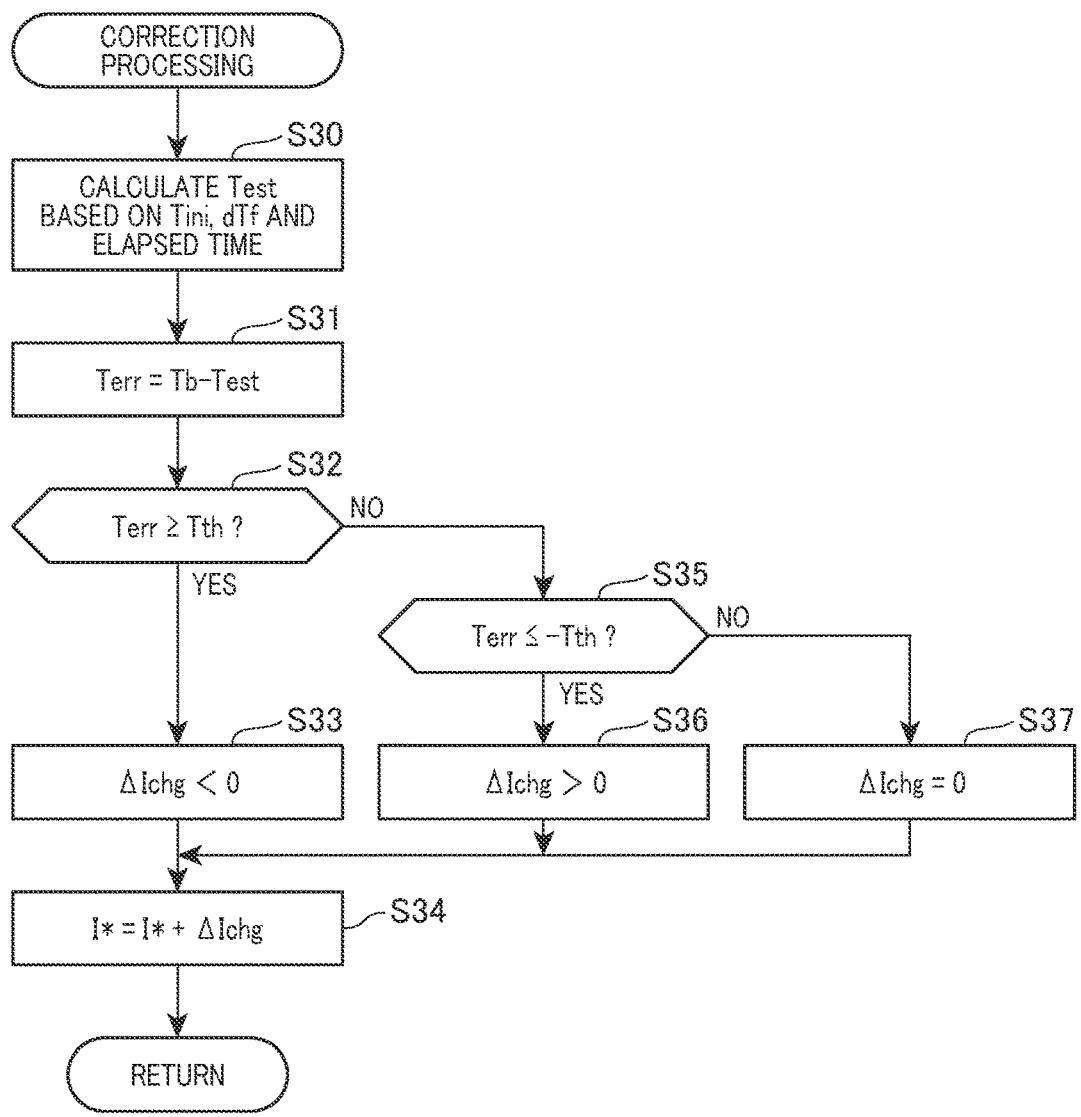
FIG. 4 is a flow diagram illustrating correction processing.

At the subsequent step S18, correction processing is performed. FIG. 4 shows the correction processing.

At step S30, an estimated temperature Test of the secondary battery 11 is calculated based on the initial temperature Tini, the charging-time temperature rise rate dTf, and elapsed time since the start of charging the secondary battery 11 at the command charging current I* in the processing of step S17. Specifically, the estimated temperature Test is calculated by adding the initial temperature Tini to the multiplied value of the charging-time temperature rise rate dTf and the elapsed time. It should be noted that the processing of step S30 corresponds to the temperature estimation unit.

At step S31, the estimated temperature Test is subtracted from the currently acquired detected temperature Tbr to calculate a temperature deviation Terr.

At step S32, it is determined whether the temperature deviation Terr is equal to or larger than a threshold Tth (>0). It should be noted that the threshold Tth at step S32 corresponds to the first threshold.

Figure 5:
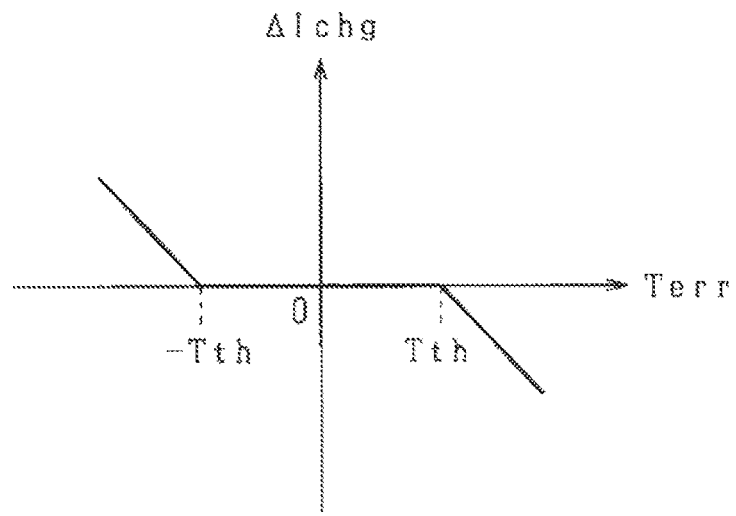
FIG. 5 is a diagram illustrating a relationship between temperature deviation and correction amount.

If an affirmative determination is made at step S32, control proceeds to step S33 where a command value correction amount ΔIchg is set to a negative value. Specifically, as shown in FIG. 5, as the absolute value of the positive temperature deviation Terr becomes larger, the absolute value of the negative command value correction amount ΔIchg is set to a larger value.

After completing the processing of step S33, control proceeds to step S34 where the command value correction amount ΔIchg set at step S33 is added to the command charging current I* calculated at step S16 to calculate a corrected command charging current I*. Thus, correction is performed to decrease the command charging current. I* calculated at step S16. Then, on or after this point, the corrected command charging current I* is used as the target current Itgt.

If the temperature deviation Terr is determined to be smaller than the threshold Tth at step S32, control proceeds to step S35 where it is determined whether the temperature deviation Terr is equal to or smaller than −Tth. It should be noted that −Tth at step S35 corresponds to the second threshold.

If an affirmative determination is made at step S35, control proceeds to step S36 where a command value correction amount ΔIchg is set to a positive value. Specifically, as shown in FIG. 5, as the absolute value of the negative temperature deviation Terr becomes larger, the absolute value of the positive command value correction value ΔIchg is set to a larger value.

After completing the processing of step S36, control proceeds to step S34 where the command value correction amount ΔIchg set at step S36 is added to the command charging current I* calculated at step S16 to calculate a corrected command charging current I*. Thus, correction is performed to increase the command charging current I* calculated at step S16. Then, on or after this point, the corrected command charging current I* is used as the target current Itgt. It should be noted that the processing of steps S32 to S36 corresponds to the correction unit.

If the temperature deviation Terr is determined to be larger than −Tth at step S35, control proceeds to step S37 where the command value correction amount ΔIchg is set to 0 (see FIG. 5). After completing the processing of step S37, if control proceeds to step S34, the command charging current I* calculated at step S16 is not corrected.

The correction processing described above is processing performed in light of variation in SOC or temperature of the secondary battery 11 between the learning phase and the constant value charging phase, which leads to variation in internal resistance of the secondary battery 11 relying on SOC or temperature.

Referring back to FIG. 3, after completing the processing of step S18, control proceeds to step S19 where it is determined whether the constant current charging phase has ended. Specifically, if the detected voltage Vbr is determined to have reached the target voltage Vtgt, it is determined that the constant current charging phase has ended. If a negative determination is made at step S19, control returns to step S18. If an affirmative determination is made at step S19, control transfers to the constant voltage charging phase in the present embodiment. In the constant voltage charging phase, the applied voltage from the charger 14 to the secondary battery 11 is feedback-controlled to the target voltage Vtgt to thereby charge the secondary battery 11.

It should be noted that, if a negative determination is made at step S12, control transfers to the constant current charging phase without setting the learning phase, Specifically, at step S20, a command charging current I* is calculated for the case where no learning phase is set. Then, at step S21, processing is started in which the calculated command charging current I* is set as the target current Itgt so that the detected charging current Ichr is feedback-controlled to the target current Itgt with the operation of the charger 14. Then, at step S22, correction processing is performed as in step S18, and at step S23, it is determined as in step S19 whether the constant current charging phase has ended.

Figure 6:
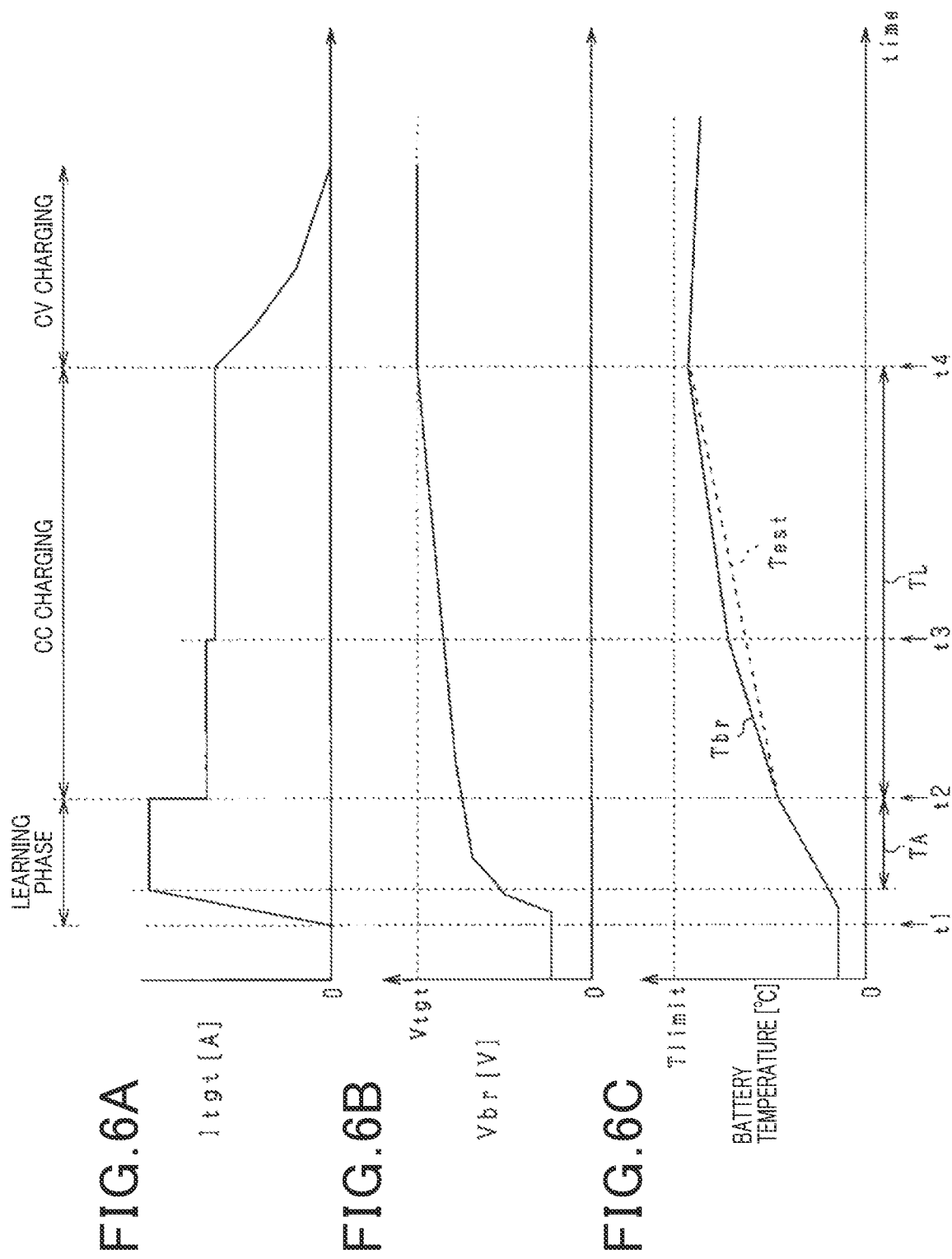
FIGS. 6A to 6C are a joint timing diagram illustrating an example of charge control processing.

FIGS. 6A-6C show an example of charge control processing. FIG. 6A shows changes in target current it, FIG. 6B shows changes in detected voltage Vbr, and FIG. 6C shows changes in detected temperature Tbr and estimated temperature Test.

At time t1, the learning phase is started and the command learning Ist is set as the target current Itgt. After that, a learning temperature rise rate dTst is calculated in the processing of step S15, and a charging-time temperature rise rate dTf and a command charging current I* are calculated in the processing of step S16.

At time t2, the constant current charging phase is started and the command charging current I* is set as the target current Itgt.

After that, at time t3, the temperature deviation Terr is determined to be higher than the estimated temperature Test by the threshold Tth or more. Accordingly, correction is performed to decrease the command charging current I*. In this case, it is preferred that the command charging current I* is gradually changed to avoid an abrupt change of the command charging current I* before and after the correction. After that, at time t4, the detected voltage Vbr reaches the target voltage Vtgt and therefore the constant voltage charging phase is started.

According to the present embodiment described above in detail, the following advantageous effects can be achieved.

In the learning phase, a learning temperature rise rate dTst is calculated, which is a temperature rise rate of the secondary battery 11 when the detected charging current Ichr is being feedback-controlled to the command learning current Ist. Based on the command learning current Ist and the learning temperature rise rate dTst, appropriate temperature variation characteristics of the secondary battery 11 can be quantified, incorporating the current deterioration state and ambient temperature of the secondary battery 11.

After that, based on the difference between the limit temperature Tlimit and the initial temperature Tini of the secondary battery 11 and the determined period. TL, there is calculated a charging-time temperature rise rate dTf that is a temperature rise rate of the secondary battery 11 in the constant current charging phase following the learning phase. Thus, in addition to the charging-time temperature rise rate dTf, the command learning current Ist and the learning temperature rise rate dTs are used for calculating the command charging current I*. Since the command learning current Ist and the learning temperature rise rate dTst are calculated in the learning phase set in the same charge control period, they are values quantifying appropriate temperature variation characteristics of the secondary battery 11 with the incorporation of the current deterioration state and ambient temperature thereof. Accordingly, use of the command learning current Ist and the learning temperature rise rate dTst in addition to the charging-time temperature rise rate dTf can lead to calculation of an appropriate command charging current I* incorporating the current deterioration state and ambient temperature of the secondary battery 11. Consequently, an appropriate command charging current I* can be calculated so that the temperature of the secondary battery 11 will not exceed the limit temperature Tlimit in the constant current charging phase.

Furthermore, prior to the start of the constant current charging phase, a command charging current I* is calculated which is used during the period from the start to the end of the constant current charging phase, so that the calculated command charging current I* can be basically used during the constant current charging phase. Thus, the period from the start to the end of charging the secondary battery 11 is prevented from significantly deviating from the charge control period.

The determined amount of rise ΔTα is divided by the learning period TA which has been required for the amount of temperature rise ΔTr to reach the determined amount of rise ΔTα to thereby calculate a learning temperature rise rate dTs. According to this calculation method, the learning temperature rise rate dTst is calculated after raising the temperature of the secondary battery 11 to some extent, even in the situation where the temperature of the secondary battery 11 is difficult to increase. Thus, the accuracy of calculating the learning temperature rise rate dTst can be enhanced, and further, the accuracy of calculating the command charging current I* can be enhanced. On the other hand, in the situation where the temperature of the secondary battery 11 is easy to increase, waiting time at step S41 is shortened more than in the situation where temperature rise is difficult, and accordingly the end of the learning phase comes earlier.

If the learning processing is determined to be inhibited at step S11, control transfers to the constant current charging phase, not to the learning phase. Thus, the learning processing is prevented from being executed in the situation where the accuracy of calculating the command learning current Ist and the learning temperature rise rate dTst is lowered.

After the start of the constant current charging phase, if the temperature deviation Terr, which is the difference between the detected temperature Tbr and the estimated temperature Test, is equal to or larger than the threshold Tth, correction is performed to decrease the command charging current I*. If the temperature deviation Terr is equal to or smaller than −Tth, correction is performed to increase the command charging current I*. Thus, the temperature of the secondary battery 11 can be controlled so as not to exceed the limit temperature Tlimit even when the command charging current determined prior to the start of the constant current charging phase is deviated from an appropriate value.

Modifications of First Embodiment

The absolute value of the threshold (>0) used at step S32 of FIG. 4 may be set to a value different from the absolute value of the threshold (<0) used at step S35.

Of the first to third conditions at step S11 of FIG. 3, any one or two of them may be used as conditions for determining whether to inhibit the learning processing.

The processing of step S14 of FIG. 3 may be processing for calculating an amount of rise in detected temperature Tbr from the beginning of charging the secondary battery 11 at the command learning current Ist in the processing of step S13 until the lapse of a predetermined period. In this case, the learning temperature rise rate dTst may be calculated, at step S15, by dividing the amount of rise in detected temperature Tbr by the predetermined period.

At step S13 of FIG. 3, the detected voltage Vbr may be used for calculating the command learning current Ist. Furthermore, SOC does not necessarily have to be used for calculating the command learning current Ist.

Second Embodiment

Referring to the drawings, a second embodiment will be described focusing on differences from the first embodiment. In the present embodiment, multiple (two) learning phases are set in an initial period of the charge control period. This setting is for further enhancing the accuracy of calculating the command charging current, in light of the positive correlation (specifically, proportional relationship) established between the command learning current and the learning temperature rise rate.

Figure 7:
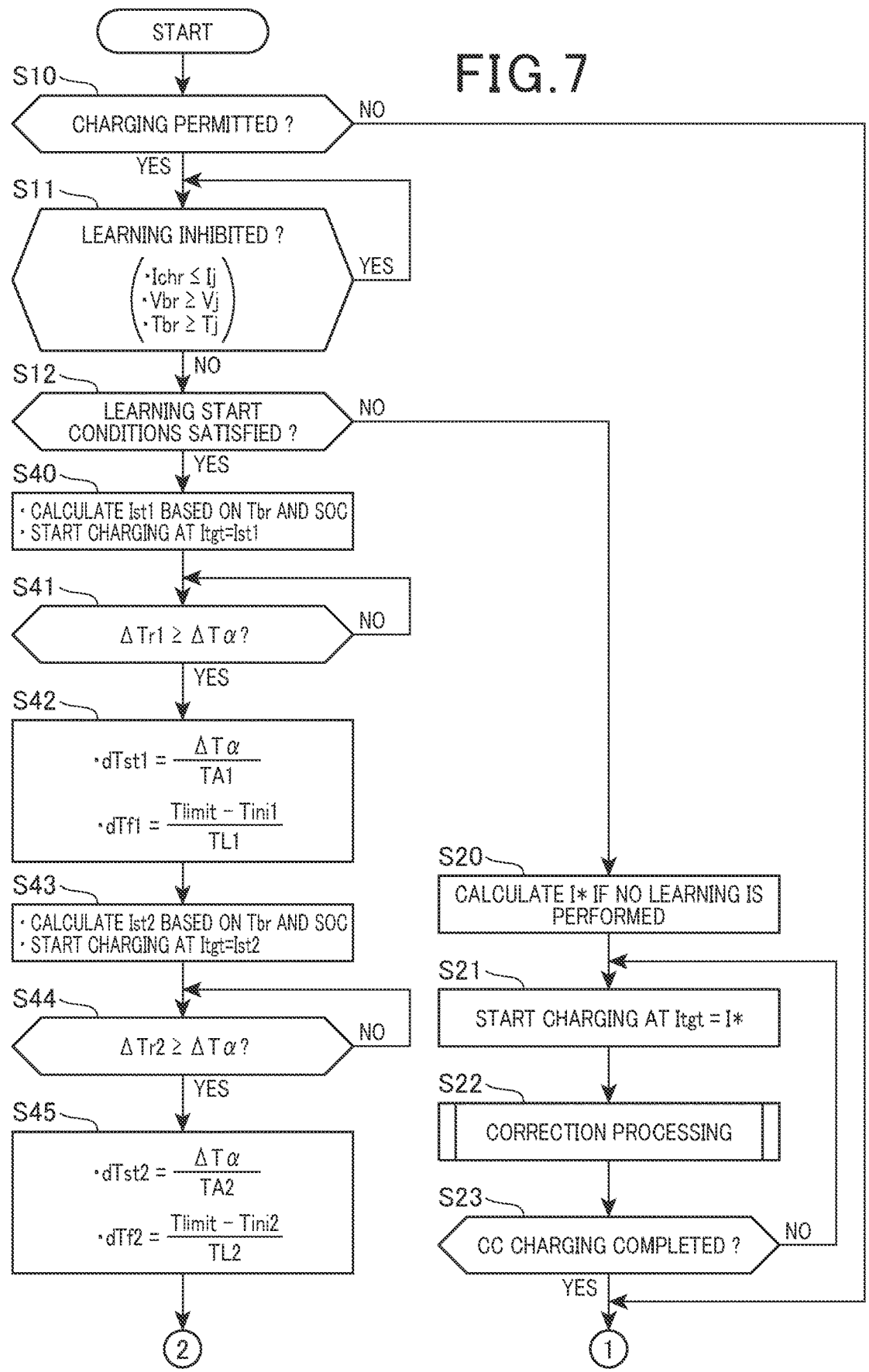
FIG. 7 is a flow diagram illustrating charge control processing according to a second embodiment.
Figure 8:
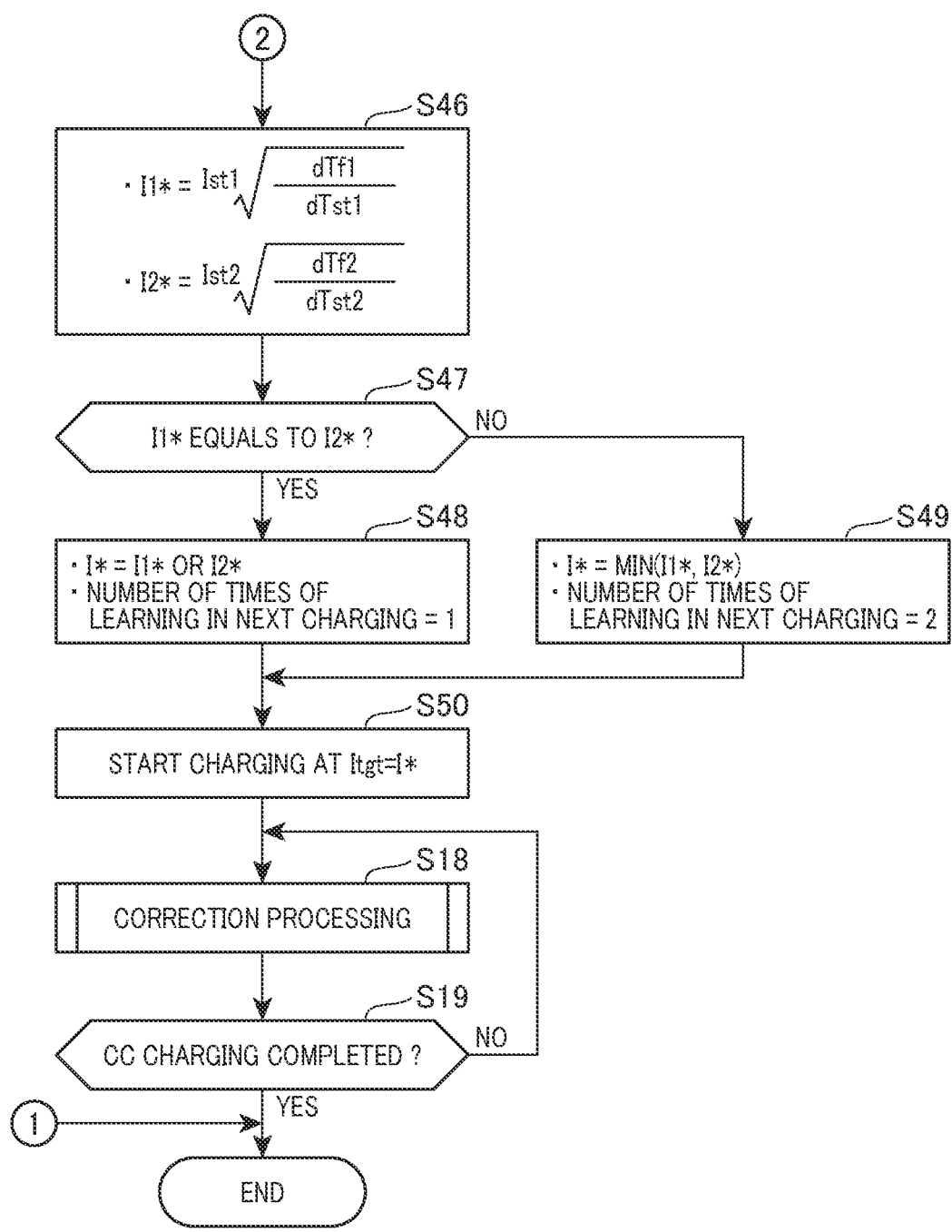
FIG. 8 is a flow diagram illustrating charge control processing.

FIGS. 7 and 8 show charge control processing according to the present embodiment. It should be noted that, in FIGS. 7 and 8, the processing that is the same as the processing shown in FIG. 3 is given the same reference sign for the sake of convenience.

If an affirmative determination is made at step S12, control proceeds to step S40. At step S40, the detected temperature Tbr and SOC are acquired, based on which, a first command learning current Ist1 for use in a first learning phase is calculated. Then, processing is started in which the calculated first command learning current Ist1 is set as the target current Itgt so that the detected charging current Ichr is feedback-controlled to the target current Itgt with the operation of the charger 14. Thus, charging of the secondary battery 11 is started at the first command learning current Ist1.

At step S41, based on the detected temperature Tbr, it is determined whether the amount of temperature rise ΔTr1 has become the determined amount of rise ΔTα since the beginning of charging the secondary battery 11 at the first command learning current NO in the processing of step S40.

If an affirmative determination is made at step S41, control proceeds to step S42 where a first learning period TM is calculated, which is a period from the beginning of charging the secondary battery 11 at the first command learning current Ist1 in the processing of step S40 until the affirmative determination made at step S41 Then, the determined amount of rise ΔTα is divided by the calculated first learning period TA1 to calculate a first learning temperature rise rate dTst1.

At step S42, a first charging-time temperature rise rate dTf1 is calculated using the following equation (eq4), based on the limit temperature Tlimit of the secondary battery 11, a first initial temperature Tini1 that is the detected temperature Tbr acquired currently, and a first determined period TL1. The first determined period TL1 may be set to, for example, a value that is the sum of the assumed values of durations of a second learning phase and the constant current charging phase.

[Math. 4]

$$dTf1 = \frac{T_{limit} - T_{ini}1}{TL1} \quad (eq4)$$

At the subsequent step S43, the detected temperature Tbr and SOC are acquired, based on which, a second command learning current for use in the second learning phase is calculated. In the present embodiment, the second command learning current Ist2 is set to a value larger than that of the first command learning current Ist1. Then, processing is started in which the calculated second command learning current Ist2 is set as the target current Itgt so that the detected charging current Ichr is feedback-controlled to the target current Itgt with the operation of the charger 14. Thus, charging of the secondary battery 11 is started at the second command learning current Ist2.

At step S44, based on the detected temperature Tbr, it is determined whether the amount of temperature rise ΔTr2 has become the determined amount of rise ΔTα since the beginning of charging the secondary battery 11 at the second command learning current Ist2 in the processing of step S43.

If an affirmative determination is made at step S44, control proceeds to step S45 where a second learning period TA2 is calculated, which is a period from the beginning of charging the secondary battery 11 at the second command learning current Ist2 in the processing of step S43 until the affirmative determination made at step S44. Then, the determined amount of rise ΔT α is divided by the calculated second learning period TA2 to calculate a second learning temperature rise rate dTst2.

At step S45, a second charging-time temperature rise rate dTf2 is calculated using the following equation (eq5), based on the limit temperature Tlimit of the secondary battery 11, a second initial temperature Tini2 that is the detected temperature Tbr acquired currently, and a second determined period TL2. In the present embodiment, the second determined period TL2 is set to an assumed value corresponding to the duration of the constant current charging phase and smaller than the first determined period TL1.

[Math. 5]

$$dTf2 = \frac{T_{limit} - T_{ini}2}{TL2} \quad (eq5)$$

At the subsequent step S46, a first command charging current I1* is calculated using the following equation (eq6), based on the first charging-time temperature rise rate dTf1 and the first learning temperature rise rate dTst1 calculated at step S42, and the first command learning current Ist1 calculated at step S40,

[Math. 6]

$$I1 *= I_{st}1\sqrt{\frac{dTf1}{dTst1}} \quad (eq6)$$

Furthermore, a second command charging current I2* is calculated using the following equation (eq7), based on the second charging-time temperature rise rate dTf2 and the second learning temperature rise rate dTst2 calculated at step S45, and the second command learning current Ist2 calculated at step S43,

[Math. 7]

$$I2 *= I_{st}2\sqrt{\frac{dTf2}{dTst2}} \quad (eq7)$$

At the subsequent step S47, it is determined whether the calculated first command charging current I1* and second command charging current I2* are equal to each other. Specifically, if the difference in absolute value between the first and second command charging currents I1* and I2* is determined to be equal to or smaller than a determined value, they are determined to be equal to each other. This determined value is set to a very small value near 0.

If the command charging currents I1* and I2* are determined to be equal to each other at step S47, control proceeds to step S48 where either one of the command charging currents I1* and I2* is selected as a command charging current I*. The reason why both of the command charging currents I1* and I2* are usable as the target current Itgt is considered to be because both of the command charging currents I1* and I2* have high reliability. Specifically, since there is a proportional relationship between the command learning current and the learning temperature rise rate, the first command charging current I1* which is calculated based on the first command learning current Ist1 and the first learning temperature rise rate dTst1 basically becomes equal to the second command charging current I2* which is calculated based on the second command learning current Ist2 and the second learning temperature rise rate dTst2.

Furthermore, at step S48, the number of learning phases in the next charge control period of the secondary battery 11 is set to 1. Thus, the processing shown in FIG. 3 of the first embodiment is performed in the next charge control. Consequently, in the next charge control, charging efficiency of the secondary battery 11 can be enhanced, and the period from the start of charging the secondary battery 11 until completion of the charging can be shortened.

If the command charging currents I1* and I2* are determined not to be equal to each other at step S47, control proceeds to step S49 where the command charging current I1* or I2*, whichever is smaller, is selected as a command charging current I*. Specifically, the first or second learning temperature rise rate dTst1 or dTst2, whichever is smaller, is used for calculating a command charging current used at step S50. According to the processing of step S49, a command charging current on a safer side can be used as a command charging current in the constant current charging phase, thereby preventing the occurrence of a situation in which the temperature of the secondary battery 11 exceeds the limit temperature Tlimit.

Furthermore, at step S49, the number of learning phases in the next charge control period of the secondary battery 11 is maintained to be 2. Thus, the processing shown in FIGS. 7 and 8 is again performed in the next charge control.

Then, at the subsequent step S50, the control unit 15 starts processing in which the command charging current I* calculated at step S48 or S49 is set as the target current Itgt so that the detected charging current Ichr is feedback-controlled to the target current Itgt with the operation of the charger 14. Thus, the constant current charging phase is started to start charging the secondary battery 11 at the command charging current I*.

FIGS. 9A-9B show an example of charge control processing, FIG. 9A shows changes in target current Itgt, and FIG. 9B shows changes in detected temperature Tbr and estimated temperature Test.

At time t1, the first learning phase is started and the first command learning current Ist1 is set as the target current Itgt. After that, a first learning temperature rise rate dTst1 and a first charging-time temperature rise rate dTf1 are calculated in the processing of step S42.

At time ta, the second learning phase is started and the second command learning current Ist2 is set as the target current Ist2. After that, a second learning temperature rise rate dTst2 and a second charging-time temperature rise rate dTf2 are calculated in the processing of step S45. Then, a command charging current I* is calculated in the processing of steps S46 to S50, and at time t2, the constant current charging phase is started. It should be noted that, at time t3, correction is performed as in FIGS. 6A-6C of the first embodiment, and at time t4, the constant voltage charging phase is started.

Other Embodiments

The embodiments described above may be modified and implemented as follows.

In the second embodiment, the first command learning current Ist1 may be smaller than the second command learning current Ist2. Furthermore, the first and second command learning currents Ist1 and Ist2 may have the same value.

In the second embodiment, the number of learning phases may be three or more.

At step S13 of FIG. 3 of the first embodiment, a command learning power Pst (corresponding to the learning command value), which is a command of the charging power of the secondary battery 11 in the learning phase, may be calculated based on the detected temperature Tbr and SOC. The command learning power Pst may be calculated, for example, to have a smaller value, as the detected temperature Tbr moves away from a reference temperature of around 0° C. toward a lower temperature side or a higher temperature side. Also, the command learning power Pst may be calculated, for example, to have a larger value, as SOC becomes higher.

Then, processing is started in which the calculated command learning power Pst is set as a target power Ptgt so that a charging power Pchr (corresponding to the charging parameter) is feedback-controlled to the target power Ptgt with the operation of the charger 14. It should be noted that the charging power Pchr may be calculated, for example, as a multiplied value of the detected charging current Ichr and the detected voltage Vbr.

After that, at step S16, a command charging power P* (corresponding to the charging command value) may be calculated using the following equation (eq8), based on the calculated charging-time temperature rise rate dTf, the learning temperature rise rate dTst calculated at step S15, and the command learning power Pst calculated at step S13. It should be noted that, when deriving the following equation (eq8), the approximation is made so that variation in terminal voltage of the secondary battery 11 in the learning phase is ignored.

[Math. 8]

$$P* = P_{st}\sqrt{\frac{dTf}{dTst}} \quad (eq8)$$

Then, at step S17, processing is started in which the calculated command charging power P* is set as the target power Ptgt so that the charging power Pchr is feedback-controlled to the target power Ptgt with the operation of the charger 14. Thus, a constant power charging phase (corresponding to the charging phase) is started and continued until an affirmative determination is made at step S19.

It should be noted that the command correction amount at step S18 is a correction amount of power, not current.

The system may be provided with a second temperature sensor in the vicinity of the secondary battery 11, targeting the components, which have correlation with the temperature of the secondary battery 11, for temperature detection. In this case, the temperature of the secondary battery 11 for use in charge control may be calculated based on the detected value of the second temperature sensor.

The present disclosure may be applied to systems that are not installed to vehicles.

The control unit and the processes thereof described in the present disclosure may be implemented by a dedicated computer which is provided by configuring a processor and a memory that are programmed to perform one or more functions. Alternatively, the control unit and the processes thereof described in the present disclosure may be implemented by a dedicated computer which is provided by configuring a processor with one or more dedicated hardware logic circuits. Alternatively, the control unit and the processes thereof described in the present disclosure may be implemented by one or more dedicated computers which are configured by combining a processor and a memory that are programmed to perform one or more functions, with a processor that is configured by one or more hardware logic circuits. Furthermore, the computer programs may be stored in a computer readable non-transitory tangible recording medium, as instructions to be performed by the computer.

The present disclosure has been described based on some embodiments however, the present disclosure should not be construed as being limited to these embodiments or structures. The scope of the present disclosure should encompass various modifications or equivalents. In addition, various combinations or modes, and further, other combinations or modes including one or more additional elements or fewer elements of the various combinations or modes should also be included within the category or idea of the present disclosure.

What is claimed is:

1. A charge control device configured (i) to be applied to a system, which includes a secondary battery and a charger electrically connected to the secondary battery, and (ii) to cause the charger to control a charging parameter that is either of charging current or charging power of the secondary battery, the charge control device comprising a control unit with a processor programmed to:
calculate, based on a temperature of the secondary battery, a learning command value of the charging parameter used in a learning phase, which is an initial period of a charge control period of the secondary battery;
operate the charger in the learning phase to control the charging parameter at the learning command value;
calculate, based on a detected temperature of the secondary battery, a learning temperature rise rate, which is a temperature rise rate of the secondary battery in the learning phase during which the charger is operated to control the charging parameter at the learning command value;
calculate, (i) prior to start of a charging phase that follows the learning phase in the charge control period and (ii) based on a limit temperature of the secondary battery and a duration of the charging phase, a charging-time temperature rise rate, which is a temperature rise rate of the secondary battery in the charging phase that follows the learning phase in the charge control period;
calculate a charging command value of the charging parameter, which is used during a period from start to end of the charging phase, based on the learning command value, the learning temperature rise rate, and the charging-time temperature rise rate; and
operate the charger in the charging phase to control the charging parameter at the charging command value.

2. The charge control device according to claim 1, wherein the processor of the control unit is programmed to calculate the charging-time temperature rise rate based on (i) a difference between an initial temperature of the secondary battery in the charging phase and the limit temperature, and (ii) a duration of the charging phase.

3. The charge control device according to claim 1, wherein the processor of the control unit is programmed to calculate the learning temperature rise rate, based on time required for an amount of temperature rise of the secondary battery to become a determined amount of rise, and the determined amount of rise.

4. The charge control device according to claim 1, wherein the processor of the control unit is programmed to determine, based on at least one of a temperature, a voltage and a charging current of the secondary battery, (i) whether to inhibit the operation of the charger in the learning phase, and (ii) whether to inhibit the calculation of the learning temperature rise rate.

5. The charge control device according to claim 1, wherein the processor of the control unit is further programmed to:
estimate a temperature of the secondary battery in the charging phase, based on the charging-time temperature rise rate;
acquire a temperature of the secondary battery;
perform correction to decrease the calculated charging command value in a case where a temperature of the secondary battery acquired in the charging phase is higher by a first threshold or more than the estimated temperature of the secondary battery in the charging phase; and
perform correction to increase the calculated charging command value in a case where the acquired temperature of the secondary battery is lower by a second threshold or more than the estimated temperature of the secondary battery in the charging phase.

6. The charge control device according to claim 1, wherein a plurality of the learning phases are set in the initial period of the charge control period.

7. The charge control device according to claim 6, wherein the processor of the control unit is programmed to set the learning command values used in the respective learning phases to different values.

8. The charge control device according to claim 6, wherein the processor of the control unit is programmed to:
calculate the learning temperature rise rates in the respective learning phases;
determine whether the calculated learning temperature rise rates are equal to each other; and
use any one of the calculated learning temperature rise rates to calculate the charging command value, in a case where the learning temperature rise rates are determined to be equal to each other.

9. The charge control device according to claim 6, wherein the processor of the control unit is programmed to:
calculate the learning temperature rise rates in the respective learning phases, phases; and
determine whether the calculated learning temperature rise rates are equal to each other; and
use a minimum learning temperature rise rate among the calculated learning temperature rise rates to calculate the charging command value, in a case where the learning temperature rise rates are determined not to be equal to each other.

10. The charge control device according to claim 6, wherein the processor of the control unit is programmed to:
calculate the learning temperature rise rates in the respective learning phases;
determine whether the calculated learning temperature rise rates are equal to each other; and
in a case where the learning temperature rise rates are determined to be equal to each other, set to 1 the number of learning phases in the next charge control period of the secondary battery.

* * * * *